United States Patent [19]

Lin et al.

[11] Patent Number: 4,691,992
[45] Date of Patent: Sep. 8, 1987

[54] REFLECTOR FOR A SPOKED WHEEL

[76] Inventors: Weng-Pin Lin; Nelson Chang, both of 30 Chien Yung Street, Tai Chung City, Taiwan

[21] Appl. No.: 770,161

[22] Filed: Aug. 27, 1985

[51] Int. Cl.⁴ .............................................. G02B 5/12
[52] U.S. Cl. ...................................................... 350/99
[58] Field of Search ......................................... 350/99

[56] References Cited

U.S. PATENT DOCUMENTS

| | | | |
|---|---|---|---|
| 3,951,517 | 4/1976 | Levy et al. | 350/99 |
| 4,037,924 | 7/1977 | May | 350/99 |
| 4,201,448 | 5/1980 | Kagayama | 350/99 |
| 4,488,774 | 12/1984 | Kagayama | 350/99 |

Primary Examiner—John K. Corbin
Assistant Examiner—Loha Ben
Attorney, Agent, or Firm—Knobbe, Martens, Olson & Bear

[57] ABSTRACT

A reflector for a spoked wheel includes a reflector body having a first side, a second side and a through hole, a locking body having a first end and a second headed end and an engaging means disposed between the first side and the headed end such that the first end will cooperate with the second side to securely fix therebetween a spoke of the wheel when the headed end is rotated relative to the reflector body.

1 Claim, 20 Drawing Figures

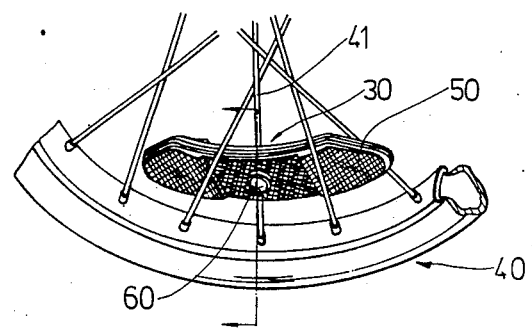
F I G. 11
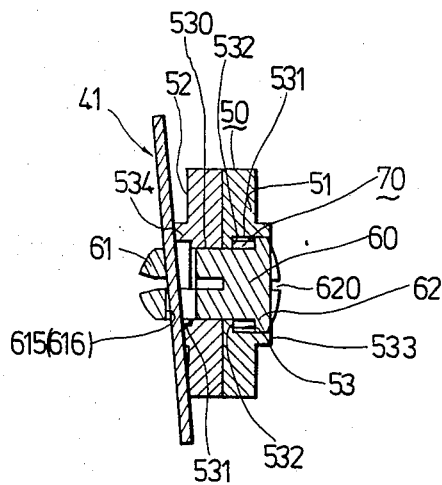
F I G. 12

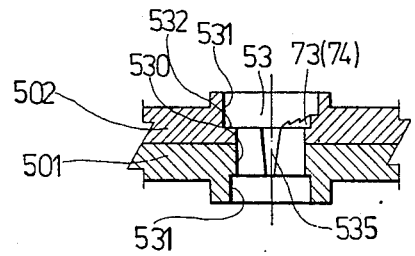
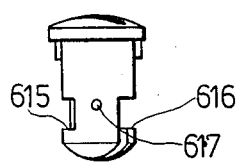
FIG. 17    FIG. 16
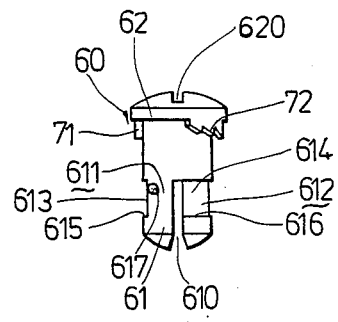
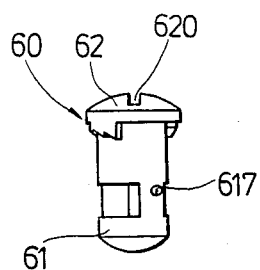
FIG. 19    FIG. 18
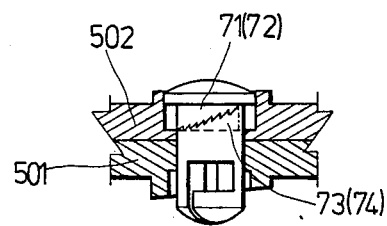
FIG. 20

REFLECTOR FOR A SPOKED WHEEL

BACKGROUND OF THE INVENTION

The present invention relates to a reflector, and more particularly to a reflector for a spoked wheel.

As is well known to one skilled in the art, a reflector on a spoked wheel is used to reflect the light emitted by headlights of an oncoming car to alert the driver therein. In the prior art, the most advanced reflector 1 for a spoked wheel known to the applicant, as shown in FIGS. 1–10, includes a reflecting plate 3 having a based circular hole 2 and a coupler 4 coaxially mounted in hole 2.

Based hole 2 has a coaxial hub 5 and broadly forms a circular boss 6 on plate 3. Upper surface of boss 6 is provided with two sockets 7 & 8 for resting thereon a spoke s of a wheel, and the lower surface of boss 6 is provided with toothed surfaces 11 & 12.

Coupler 4 includes a head having a groove 16 in which a screwdriver can engage, and two legs 13 respectively attached to two side pieces 14 & 15 respectively provided with two toothed surfaces 17 & 18. Legs 13 are respectively excavated at portions 19 & 20 which communicate with the central groove between legs 13 to receive therein spoke s when coupler 4 is rotated relative to reflecting plate 3. Thus, when spoke s is inserted through the central groove of legs 13 and coupler 4 is rotated relative to reflecting plate 3, reflecting plate 3 and coupler 4 will securely be fixed to spoke s by the engagement between toothed surfaces 11 and 12 and 17 and 18. Grooves 21 and 22 are provided to receive hub 5. Such a reflector 1 can have reflecting plate 3 and coupler 4 fixed firmly to spoke s, however, reflector 1 will become useless if coupler 4 is lost.

The present applicant tries in another aspect to provide a reflector for a spoked wheel, which can, additionally, overcome the above drawback encountered by the most advanced prior art.

SUMMARY OF THE INVENTION

It is therefore an object of the present invention to provide a reflector for a spoked wheel, which can be easily and durably secured to a spoke of a wheel.

According to the present invention, a reflector for a spoked wheel includes a reflector body having a first side, a second side and a through hole, a locking body having a first end and a second headed end and an engaging means disposed between the first side and the headed end such that the first end will cooperate with the second side to securely fix therebetween a spoke of the wheel when the headed end is rotated relative to the reflector body.

Certainly, the through hole can be circular with the central portion thereof having a diameter smaller than that of the remaining portion, the inner wall of which extends to establish two circular bosses respectively on the first and second sides wherein the boss on the seond side has two diametrically disposed sockets for resting theron the spoke.

Certainly, the first end can be a two-forked end with the central groove between two legs thereof being capable of containing the spoke, and is excavated in the central portions of the two legs, the respective excavated central portions respectively defining two retaining walls such that the retaining walls will securely urge the spoke to rest on the socket when the headed end is rotated relative to the reflector body, and the headed end can have a top groove in which a suitable tool can engage to rotate the locking body.

The engaging means can include a first inclined toothed surface disposed beneath the heated end and a corresponding second inclined toothed surface disposed on the shoulder portion formed between the central portion and the remaining portion of the through hole near the first side such that the first inclined toothed surface can be rotated relative to the second inclined toothed surface in a first direction but not in a second direction.

Certainly, the central portion of the through hole can be further provided with a through groove and one of the legs is provided with a protrusion having a dimension slightly larger than that of the groove such that the locking body will be retained in the through hole when the protrusion is pressed into the through groove. Certainly, the reflector body can include a first reflecting piece formed with a corresponding second reflecting piece back to back.

Certainly, each of the reflecting pieces can include a plurality of reflecting zones capable of reflecting lights of different incident angles.

The present invention may best be understood with reference to the accompanying drawings, in which:

BRIEF DESCRIPTION OF THE DRAWINGS

FIG. 11 is a schematic view showing a reflector according to the present invention fixed to a spoked wheel;

FIG. 12 is a sectional view showing a reflector according to the present invention;

FIG. 16 is a schematically sectional view showing a reflecting body of a reflector according to the present invention;

FIG. 17 is a side view showing a locking body of a reflector according to the present invention;

FIG. 18 is another side view showing a locking body of a reflector according to the present invention;

FIG. 19 is further a side view showing a locking body of a reflector according to the present invention; and FIG. 20 is a schematic view showing a locking body inserted in a reflecting body of a reflector according to the present invention.

DETAILED DESCRIPTION OF THE PREFERRED EMBODIMENT

Figure 1:
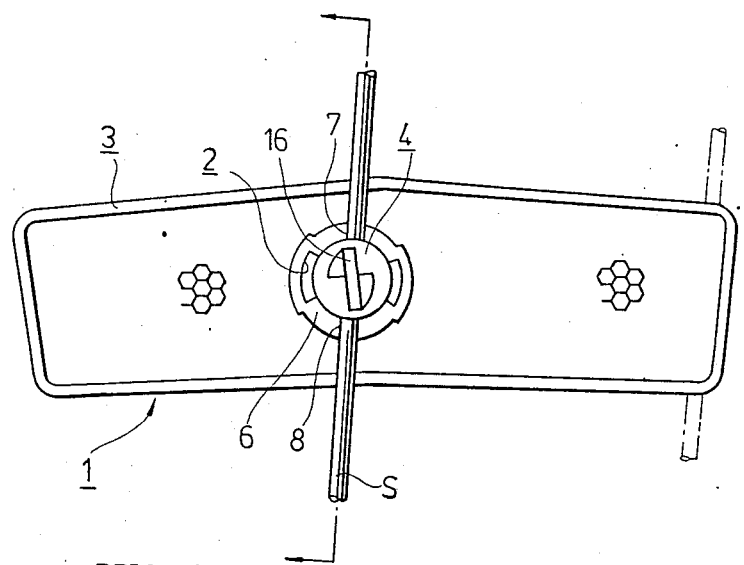
FIG. 1 is a schematic front view showing a prior reflector for a spoked wheel.
Figure 2:
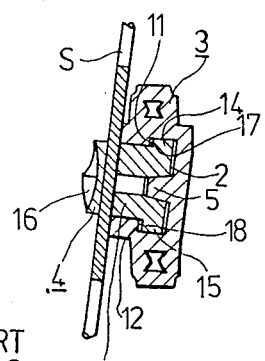
FIG. 2 is a crosssectional view of the reflector shown in FIG. 1.
Figure 3:
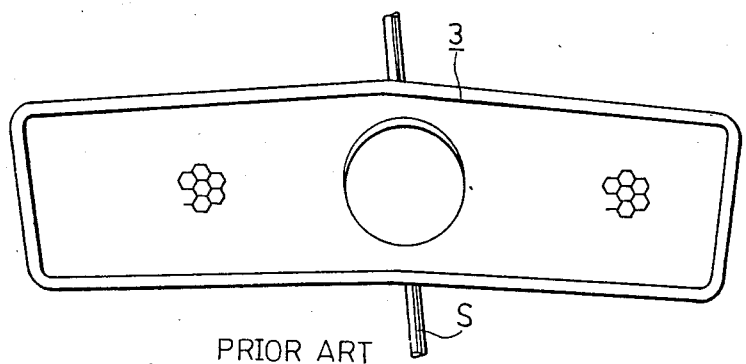
FIG. 3 is a schematic rear view showing the reflector in FIG. 1.
Figure 4:
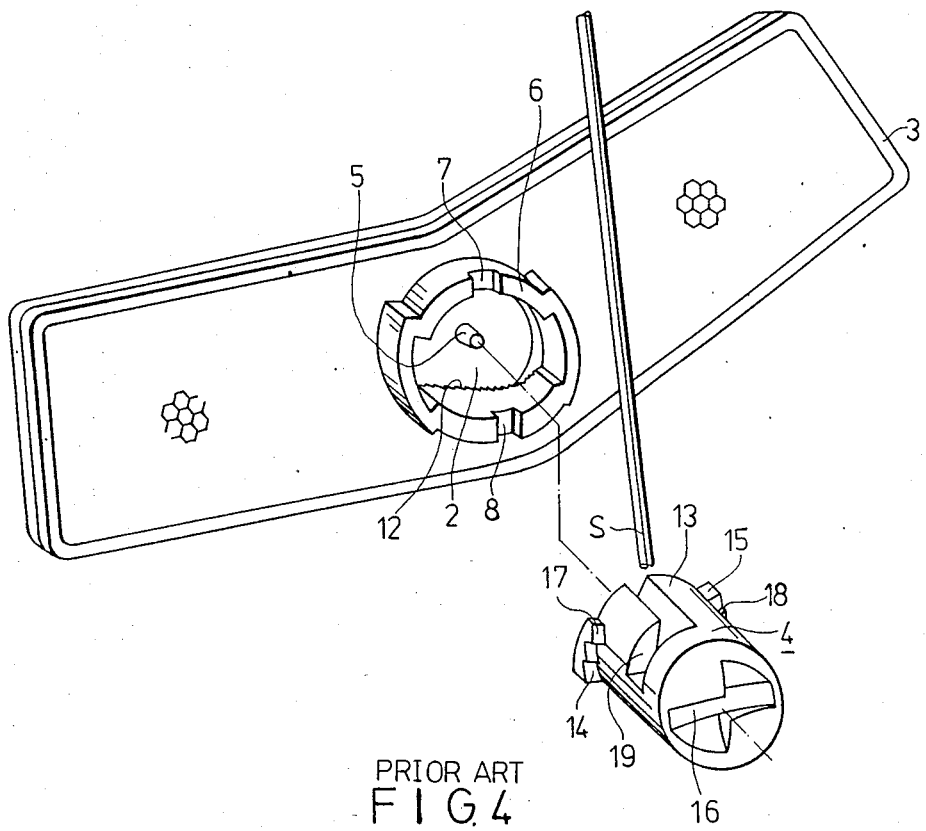
FIG. 4 is an exploded view showing the reflector shown in FIG. 1.
Figure 5:
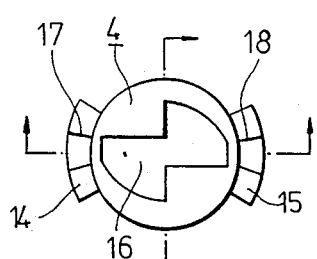
FIG. 5 is a top view showing the coupler of a prior reflector shown in FIG. 4.
Figure 6:
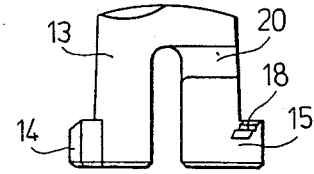
FIG. 6 is a side view showing the coupler shoulder in FIG. 4.
Figure 7:
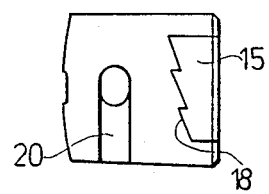
FIG. 7 is another side view showing the coupler shown in FIG. 4.
Figure 9:
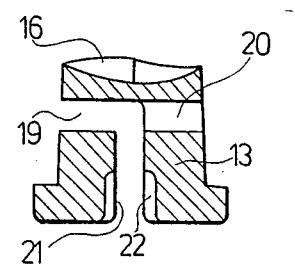
FIG. 9 is a sectional view showing the coupler shown in FIG. 4.
Figure 8:
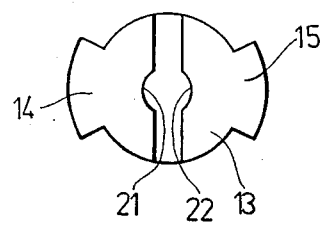
FIG. 8 is a bottom view showing the coupler shown in FIG. 4.
Figure 10:
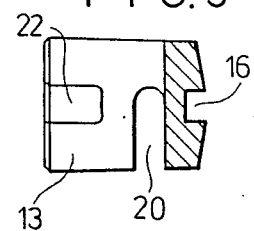
FIG. 10 is another sectional view showing the coupler shown in FIG. 4.
Figure 13:
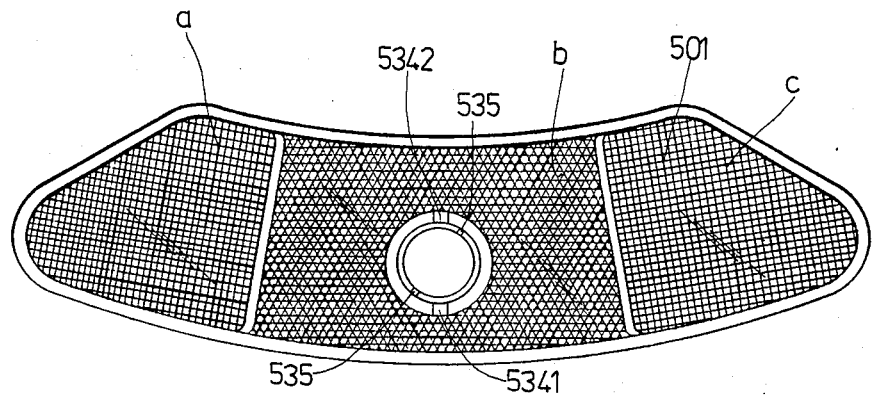
FIG. 13 is a rear view showing a reflecting body of a reflector according to the present invention.

Referring now to FIGS. 11-20, a reflector 30 for a spoked wheel 40 according to the present invention includes a reflector body 50 having a first side 51, a second side 52 and a through hole 53, a locking body 60 having a first end 61 and a second headed end 62 and an engaging means 70 disposed between first side 51 and headed end 62 such that first end 61 will cooperate with second side 52 to securely fix therebetween a spoke 41 of wheel 40 when headed end 62 is rotated relative to reflector body 50.

Through hole 53 can be circular with the central portion thereof 530 having a diameter smaller than that of the remaining portion thereof 531, the inner wall of which extends to establish two circular bosses 533, 534 respectively on first and second sides 51, 52 wherein the boss 534 on second side 52 has two diametrically disposed sockets 5341, 5342 for resting thereon spoke 41.

First end 61 can be a two-forked end with the central groove 610 between two legs thereof 611, 612 capable of containing spoke 41 and is excavated in the central portions 613, 614 of legs 611, 612, the respect excavated central portions 613, 614 respectively defining two retaining walls 615, 616 such that retaining walls 615, 616 will urge spoke 41 to rest securely on sockets 5341, 5342 when headed end 62 is rotated relative to reflector body 50. Headed end 62 can have a top groove 620 upon which a suitable tool can engage to rotate locking body 60.

Engaging means 70 can include two first inclined toothed surfaces 71, 72 disposed beneath headed end 62 and two corresponding second inclined toothed surfaces 73, 74 disposed on the shoulder portion 532 formed between central portion 530 and remaining portion 531 of through hole 53 near first side 51 such that first inclined toothed surfaces 71, 72 can be rotated relative to second inclined toothed surfaces 73, 74 in a first direction but cannot be rotated in an opposite second direction.

Certainly, central portion 530 can be further provided with two through grooves 535 and legs 611, 612 can be respectively provided with two protrusions 617 having a dimension slightly larger than that of grooves 535 such that locking body 60 will be retained in through hole 53 when protrusions 617 are pressed into through grooves 535. Furthermore, for easing the pressing of protrusions 617 into through grooves 535, grooves 535 can be tapered as is clearly shown in FIG. 16. Since the present reflector 30 is sold with protrusions 617 pressed into grooves 535, and locking body 60 will thus be retained in through hole 53, preventing locking body 60 from being lost.

Figure 14:
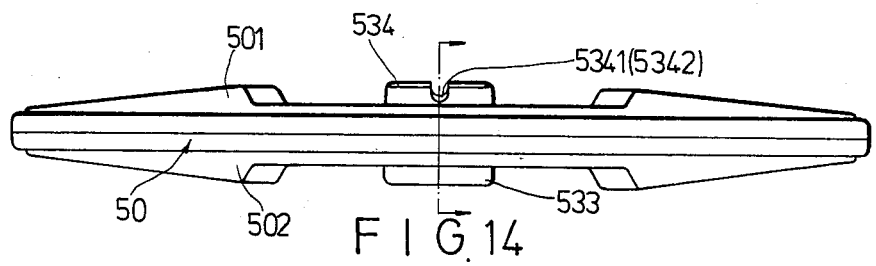
FIG. 14 is a top view showing a reflecting body of a reflector according to the present invention.
Figure 15:
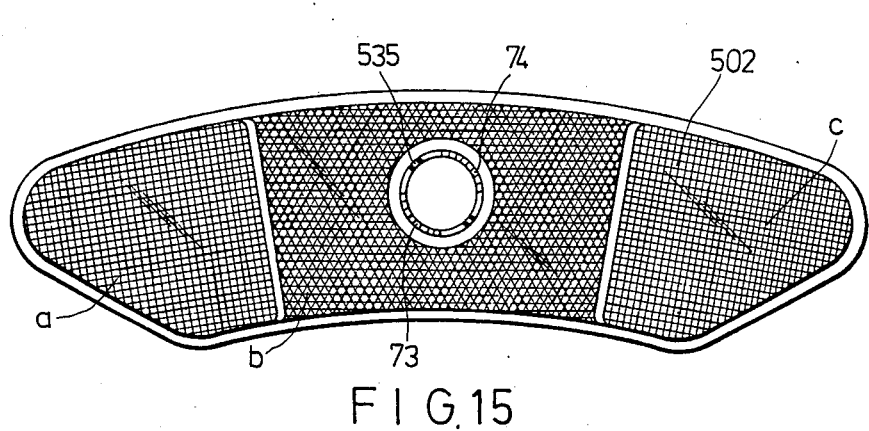
FIG. 15 is a front view showing a reflecting body of a reflector according to the present invention.

Certainly, reflector body 50 can include a first reflecting piece 501 formed with a corresponding second reflecting piece 502 back to back as best shown in FIG. 14.

Moreover, each of reflecting pieces 501, 502 can include three reflecting zones a, b & c capable of reflecting lights of different incident angles.

Upon mounting reflector 30, it is only necessary for one to rest spoke 41 on sockets 5341, 5342, and then, to rotate locking body 60 relative to reflector body 50 with a suitable tool, e.g. a coin, engaging with groove 620.

While the present invention has been described in connection with what is presently considered to be the most practical and preferred embodiments, it is to be understood that the invention is not to be limited to the disclosed embodiments but on the contrary, is intended to cover various modifications and equivalent arrangements included within the spirt and scope of the appended claims which scope is to be accorded the broadest interpretattion so as to encompass all such modifications and equivalent structures.

What I claim is:

1. A reflector for a spoked wheel, comprising:
   a reflector plate having a first side, a second side and a wall forming a circular through hole extending from said first side to said second side, said wall forming a smaller diameter central portion between two large diameter outer remaining portions so that said wall defines a first annular shoulder between said central portion and one of said remaining portions near said first side, said first shoulder including inclined toothed surfaces, said wall also forming a second annular shoulder between said central portion and another of said remaining portions, said wall forming said central portion including an axial groove converging from said first annular shoulder to said second annular shoulder, said wall extending from said first side to form a first circular boss on said first side, said wall also extending from said second side to form a second circular boss on said second side, said second circular boss including two diametrically opposed notches at the edge thereof for receiving a spoke; and
   a cylindrical locking body insertable into said through hole, comprising;
      a headed end including axially inward projecting inclined toothed surfaces engageable with said toothed surfaces of said first annular shoulder of said reflector plate.
      a forked end extending opposite said headed end forming two legs spaced to define a diametral access for a spoke, said legs including grooves in their inner portions to define retaining walls shaped to retain a spoke in a diameter position angled relative to said diametral access, in order to clamp said spoke against said notches of said reflector plate, and
      a protrusion extending from the periphery of said locking body near said forked end, said protrusion of a shape and size permitting it to move within said axial groove of said central portion when said locking body is inserted into said through hole, but causing said protrusion to be retained by said second shoulder when said locking body is rotated after being inserted into said through hole, so that said protrusion is not aligned with said groove.

* * * * *